United States Patent [19]

Kawamura

[11] Patent Number: 4,771,655

[45] Date of Patent: Sep. 20, 1988

[54] ROTARY ACTUATOR

[75] Inventor: Yuji Kawamura, Kanagawa, Japan

[73] Assignees: Jidosha Denki Kogyo Kabushiki Kaisha; Tokico Ltd., both of Kanagawa, Japan

[21] Appl. No.: 19,052

[22] Filed: Feb. 26, 1987

[30] Foreign Application Priority Data

Feb. 28, 1986 [JP] Japan .............................. 61-29273[U]

[51] Int. Cl.$^4$ .............................................. F16F 9/46
[52] U.S. Cl. ................................... 74/813 L; 74/530; 74/820; 188/299
[58] Field of Search ...................... 74/436, 820, 813 L, 74/530, 84 R; 188/299, 319

[56] References Cited

U.S. PATENT DOCUMENTS

| | | | |
|---|---|---|---|
| 3,478,616 | 11/1969 | Smith | 74/436 |
| 4,512,214 | 4/1985 | Surman | 74/436 |
| 4,644,825 | 2/1987 | Yamazaki | 74/813 L |
| 4,665,764 | 5/1987 | Inoue et al. | 74/436 |
| 4,686,863 | 8/1987 | Inoue et al. | 74/425 |

Primary Examiner—Leslie A. Braun
Assistant Examiner—Scott Anchell
Attorney, Agent, or Firm—Wenderoth, Lind & Ponack

[57] ABSTRACT

A rotary actuator has a first rotor rotatable around a first axis and having a plurality of first projections circumferentially spaced and axially projecting from one end surface thereof, a second rotor rotatable around a second axis which is eccentric to the first axis and having at least a second projection circumferentially spaced and axially projecting from one end surface thereof, a rotating mechanism connected to the second rotor to rotate the second rotor, the first and second rotors being arranged such that their end surfaces face each other so that the second projection may engage with either one of the first projections to rotate the first rotor through a predetermined angle when the second rotor is rotated. The rotary actuator further has a detent stop for preventing the first rotor from rotating and holding the first rotor stationary in position while the second projection is engaged with neither one of the first projections and for releasing and allowing the first rotor to rotate while the second projection is engaged with either one of the first projections.

2 Claims, 3 Drawing Sheets

ROTARY ACTUATOR

BACKGROUND OF THE INVENTION

This invention relates to a rotary actuator, and more particularly relates to a rotary actuator adapted to be utilized in, for example, a hydraulic damping device of the adjustable damping force type.

As one example of a hydraulic damping device of the adjustable damping force type, there is disclosed in "The Weekly Service No. 489" issued by Nissan Motor Co., Ltd. in September 1983 a hydraulic damping device in which damping force can be adjusted by rotating an adjusting rod inserted through a bore formed in a piston rod of the damper.

U.S. patent application Ser. No. 824,965 filed on Jan. 31, 1986, now U.S. Pat. No. 4,686,863 and assigned to the same entity as this application discloses a rotary actuator which is designed to rotate an adjusting rod in a piston rod of a hydraulic damper which constitutes a hydraulic damping device as described above. The rotary actuator comprises a motor, a transmission mechanism coupled to the motor, a first rotor connected to the transmission mechanism and adapted to be rotatable around a first axis, and a second rotor adapted to be rotatable around a second axis which is eccentric with respect to the first axis and is connected to an adjusting rod in a piston rod of a hydraulic damper. In order to change the damping force mode, the motor is switched on to rotate the first rotor through the transmission mechanism. Then, a projection formed on an upper surface of the first rotor engages with a projection formed on a lower surface of the second rotor to rotate the second rotor through a predetermined angle.

However, the rotary actuator mentioned above is not provided with means for holding the second rotor stationary after the second rotor has been rotated through the predetermined angle. Therefore, when, for example, the second rotor is rotated in the direction opposite to the normal one in installing the actuator in a vehicle, it is possible that the projection of the first rotor will be strongly pressed against the projection of the second rotor such as to bite into the same. Further, since the actuator is mounted on a vehicle, the second rotor may unintentionally rotate by virtue of vibration of the vehicle. Therefore, when the amount of the unintentional rotation is relatively large, the hydraulic damping device may be operated accidentally. In these circumstances there has been a need for an actuator which is more reliable in operation.

The present invention has been accomplished in view of the aforesaid circumstances and the object of the invention is to provide a rotary actuator which is reliable in operation and which makes it possible to reliably change the damping force mode of a hydraulic damper.

SUMMARY OF THE INVENTION

According to the invention, the aforesaid object can be accomplished by a rotary actuator comprising a first rotor rotatable around a first axis and having a plurality of first projections circumferentially spaced and axially projecting from one end surface thereof, a second rotor rotatable around a second axis which is eccentric with respect to the first axis and having at least a second projection circumferentially spaced and axially projecting from one end surface thereof, and a rotating mechanism connected to the second rotor for rotating the second rotor around the second axis, said first and second rotors being arranged such that the end surfaces of the first and the second rotors from which the first and the second projections respectively project face each other so that the at least second projection may engage with either one of the first projections to rotate the first rotor through a predetermined angle when the second rotor is rotated by the rotating mechanism, said rotary actuator further comprising detent stop means for preventing the first rotor from rotating and holding the first rotor stationary in position while the at least second projection is engaged with neither one of the first projections and for releasing and allowing the first rotor to rotate while the at least second projection is engaged with either one of the first projections.

According to a preferred embodiment, the detent stop means includes a cam arrangement formed on the first and the second rotor and a cam follower adapted to be driven through the cam arrangement.

BRIEF DESCRIPTION OF THE DRAWINGS

Other features and advantages of the invention will be apparent from the following description taken in connection with the accompanying drawings wherein.

DETAILED DESCRIPTION OF THE PREFERRED EMBODIMENT

Figure 1:
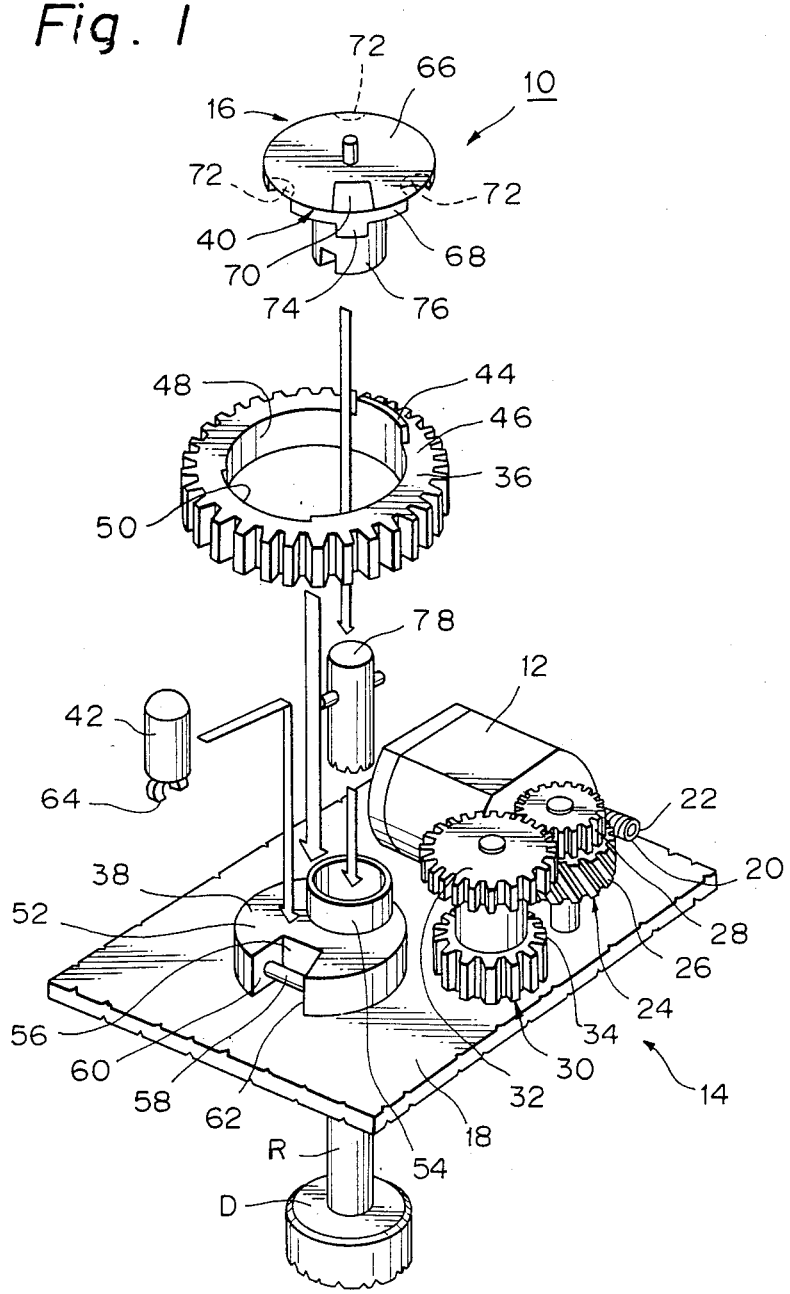
FIG. 1 is an exploded perspective view of a preferred embodiment according to the invention.

Referring to FIGS. 1 to 3, a preferred embodiment according to the invention will be explained.

A rotary actuator 10 mounted above a hydraulic damper D, the uppermost portion of which is shown in FIG. 1, mainly comprises a motor 12, a transmission mechanism 14 connected to the motor 12 and a cam arrangement 16 adapted to be operably connected to the transmission mechanism 14.

The motor 12 is mounted on a base plate 18 of the actuator 10. A worm 20 press-fitted onto the output shaft 22 of the motor 12 meshes with a relatively large diameter worm gear 26 of a first reduction gear member 24 and a relatively small diameter first pinion 28 formed on the first reduction gear member 24 meshes with a relatively large diameter gear 32 of a second reduction gear member 30. Further, a second pinion 34 formed on the second reduction gear member 30 is adapted to mesh with a first rotor or an output gear member 36 mounted on and rotatable around a cylindrical projection 38 on the base plate 18.

The cam arrangement 16 comprises the first rotor or the output gear member 36, a second rotor or output shaft rotating cam member 40 adapted to be rotatable on the upper side of the cylindrical projection 38 and a detent stop member 42 adapted to be mounted on the cylindrical projection 38.

The output gear member 36 includes a projection 44 upwardly projecting from the upper end surface 46 of the member 36. The projection 44 is formed along the inner circumference 48 of the output gear member 36 with a predetermined circumferential length. The output gear member 36 further includes an axial groove 50 formed in the inner circumference 48. The groove 50 is located diametrically opposite the projection 44 and has a predetermined circumferential length. On the upper end surface 52 of the cylindrical projection 38 around which the output gear member 36 is adapted to rotate is formed a bearing 54 for supporting the cam member 40 which projects upwardly, the axis of which bearing is eccentric with respect to that of the cylindrical projection 38. An axial groove 56 for receiving the detent stop member 42 is formed in the outer circumference of the cylindrical projection 38. The groove 56 is opposite to the bearing 54 with respect to the center of the cylindrical projection 38. A shaft 58 for rotatably supporting the detent stop member 42 is formed such as to extend between the opposite side walls 60, 62 of the groove 56. The groove 56 is adapted to receive the detent stop member 42 which is generally cylindrical. The detent stop member 42 has a fitting portion 64 formed at the lower end thereof and is shaped to be capable of fitting on the shaft 58. The detent stop member 42 is rotatably mounted on the shaft 58.

The cam member 40 consists of a conductive plate 66 and a cam plate 68. The conductive plate 66 is in the shape of a disk having a cutout portion 70 and is integrally attached to the upper end surface of the cam plate 68 by such means as bonding. Contacts of a control system (not shown) for controlling the motor 12 are arranged to be in contact with the conductive plate 66 and the control system controls the motor 12 in such a manner that the motor 12 begins to rotate in response to switch operation of the system and automatically stops when the cam member 40 has rotated through a predetermined angle. An example of such a control system is described in detail in the aforementioned U.S. patent application Ser. No. 824,965 which is incorporated herein by reference. The cam plate 68 attached to the lower surface of the conductive plate 66 has a plurality of equally spaced axial grooves 72 for receiving the detent stop member 42 formed in the outer circumference. The grooves 72 have arcuate surfaces the curvature of which is approximately equal to that of the detent stop member 42. In this embodiment, three grooves 72 are provided. The cam plate 68 is further provided with a plurality of downwardly projecting projections 74 (three in this embodiment) diametrically opposed to the respective grooves 72.

Further, the cam plate 68 is provided with a cam shaft 76 integrally formed on the lower surface thereof. The cam shaft 76 is adapted to be rotatably supported by the bearing 54 and to be connected at the lower end thereof with an output shaft 78 which is coupled to an adjusting rod (not shown) inserted through a hollow piston rod R of the hydraulic damper D for common rotation.

Referring now to FIGS. 2 and 3, explanation will be given of the operation of a detent stop mechanism which consists of the output gear member 36, cam member 40 and detent stop member 42.

Figure 3A:
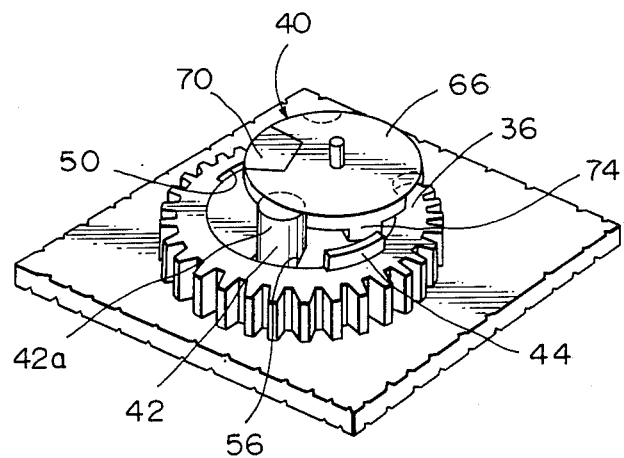
FIG. 3(a) is similar to FIG. 2(a) but showing a condition in which the first rotor is prevented from rotating and is held stationary in position.
Figure 3B:
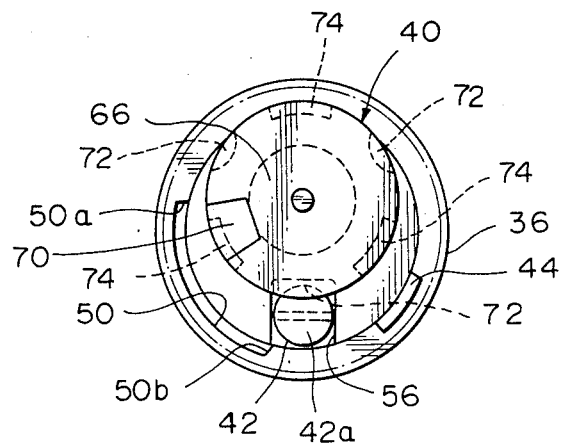
FIG. 3(b) is a plan view of FIG. 3(a).

Assuming that the hydraulic damper D is set into a certain damping force mode and the switch of the aforementioned control system is in the inactuated condition, the rotary actuator 10 is kept at a standstill. Namely, electric current is not supplied to the motor 12 and the same is not actuated. Therefore, the output gear member 36 and the cam member 40 are also at a stop. In this condition, as shown in FIGS. 3(a) and 3(b), the projection 44 of the gear member 36 is not in engagement with either of the projections 74 of the cam member 40. The detent stop member 42 stands straight with approximately the lower half thereof being received in a space defined by the groove 56 of the cylindrical projection 38 and a portion of the inner circumference 48 of the gear member 36. It will be noted that the detent stop member cannot rotate about the shaft 58. The detent stop member 42 also engages with the cam member 40 with the upper end portion 42a thereof being received in one of the grooves 72 of the cam member 40. Therefore, the cam member 40 is prevented from rotating and is held stationary.

Figure 2A:
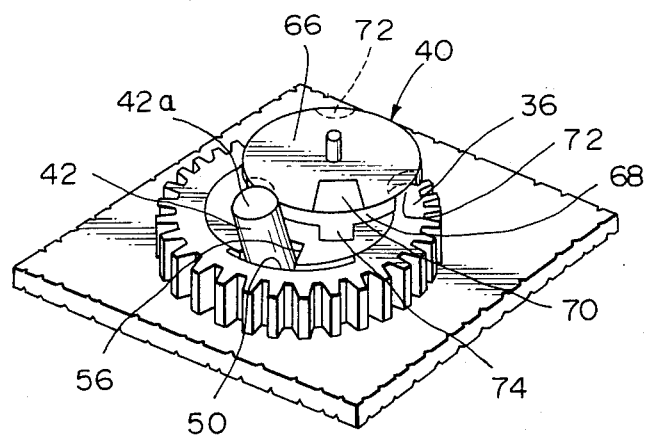
FIG. 2(a) is a perspective view showing a condition in which the first rotor is rotating.
Figure 2B:
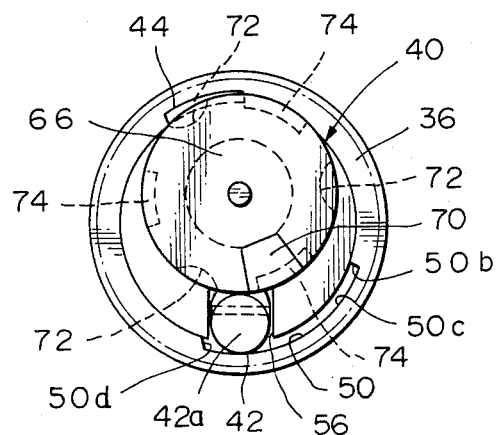
FIG. 2(b) is a plan view of FIG. 2(a)

Next, the switch of the aforementioned control system is actuated to change the mode of the damper D, and electric current flows through the motor 12 in response to the switch operation. The motor 12 is actuated to rotate the output gear member 36 in one direction about the cylindrical projection 38 through the transmission mechanism 14, while the cam member 40 is still kept stationary by the detent stop member 42. When the projection 44 of the gear member 36 being rotated reaches the position in which the projection 44 comes into engagement with one of the projections 74 of the cam member 40, one circumferential end portion 50a of the groove 50 of the gear member 36 reaches the position in which the one end portion 50a faces the detent stop member 42. It will be noted that, in this condition, the detent stop member 42 can be rotated about the shaft in the direction wherein the upper end portion 42a of the detent stop member 42 moves away from the groove 72 of the cam member 40 in which the upper end portion is received, since there is clearance between a bottom surface 50c of the groove 50 of the output gear member 36 and the outer circumference of the detent stop member 42. Therefore, the gear member 36 continues to be rotated, the projection 44 of the gear member 36 applies force on the projection 74 of the cam member 40 to rotate the cam member 40 in the same direction as that of the rotation of the output gear member 36, and, at the same time, the groove 72 of the cam member 40 applies force on the detent stop member 42 to rotate the detent stop member about the shaft. Thus, the cam member 40 rotates, pushing the detent stop member 42 out of the groove 72 of the cam member 40 in which the upper end portion 42a was accommodated. As shown in FIGS. 2(a) and 2(b), the cam member 40 continues to be rotated as long as the projection 44 of the output gear member 36 engages with the projection 74 of the cam member, and the detent stop member 42 does not prevent the cam member 40 from rotating since the upper end portion 42a slides on the outer circumferential surface of the cam plate 68 of the cam member 40.

It will be noted that while the output gear member 36 continues to be further rotated, the projection 44 disengages from the projection 74 having engaged with the projection 44 at a predetermined position, namely when the cam member 40 is rotated through the predetermined angle, since the axis of rotation of the cam member 40 is eccentric with respect to that of the output gear member 36 as described above. The grooves 72 of the cam member 40 are angularly spaced by an angle which is equal to the predetermined angle through which the cam member 40 is rotated by virtue of the engagement between the projection 44 and one of the projections 74. Therefore, another groove 72, i.e. the one adjacent to the groove 72 within which the detent stop member 42 was first accommodated, approaches the position in which it will itself face the detent stop member 42 as the projection 44 approaches the disengaging position. At the same time, the other circumferential end portion 50b of the groove 50 of the output gear member 36 also approaches the detent stop member 42. As the output gear member 36 rotates further, it applies force through a slope formed in the other end portion 50b of the groove 50 on the detent stop member 42 to rotate the same about the shaft 58 in the direction wherein the upper end portion 42a of the detent stop member 42 is pushed into the corresponding other groove 72 of the cam member 40. When the approximately lower half of the detent stop member 42 again mounts on the inner circumference of the output gear member 36, the detent stop member 42 once more stands up straight with the upper end portion 42a completely accommodated within the next groove 72 of the cam member 40. At this time, the projection 44 of the output gear member 36 disengages from the projection 74 of the cam member 40 and the cam member 40 stops. Then, the control system cuts off the electric current flowing through the motor 12. Therefore, the rotary actuator 10 returns to its inactuated condition and the cam member 40 is reliably held stationary in the new position. Thus, the operation of changing the damping force mode of the hydraulic damper D is completed and the hydraulic damper D is reliably kept in the selected mode.

When the switch of the control system is again actuated, the operation described above will be repeated.

It is to be understood that the invention is not limited in application to the details of construction and arrangement of parts illustrated in the accompanying drawings, since the invention is capable of being utilized in other embodiments and of being practiced or carried out in various ways. Also it is to be understood that the phraseology or terminology employed herein is for the purpose of description and not of limitation.

What is claimed is:

1. A rotary actuator comprising:
   a first rotor rotatable around a first axis and having a circular inner circumference and at least one first projection circumferentially positioned and axially projecting from one end surface thereof;
   a second rotor rotatable around a second axis which is eccentric with respect to the first axis and having a circular outer circumference and a plurality of second projections circumferentially spaced and axially projecting from one end surface thereof;
   a rotating mechanism connected to the first rotor for rotating the first rotor around the first axis;
   said first and second rotors being arranged such that the end surfaces of the first and the second rotors from which the first and the second projections respectively project face each other so that the at least one first projection may engage with any of the second projections to rotate the second rotor through a predetermined angle when the first rotor is rotated by the rotating mechanism;
   detent stop means for preventing the second rotor from rotating and holding the second rotor stationary in position while the said at least one first projection is out of engagement with the second projections and for releasing and allowing the second rotor to rotate while said at least one first projection is engaged with one of said second projections, said detent stop means including a cam arrangement formed on the inner and outer circumferences of the respective rotors;
   a cylindrical projection the axis of which coincides with the first axis and on which the first rotor is adapted to be rotatably mounted; and
   a cam follower swingably mounted on said cylindrical projection and driven by said cam arrangement.

2. A rotary actuator according to claim 1, wherein said second rotor has a plurality of axial grooves formed in the circular outer circumference thereof, and said first rotor has at least one axial groove in the circular inner circumference thereof, said axial grooves being said cam arrangement, said cam follower being cylindrical and being swung in such a manner that an upper end portion thereof is received in one of the axial grooves in the outer circumference of said second rotor and an approximately lower half portion thereof slidingly contacts the inner circumference of said first rotor when said at least one projection is disengaged from said second projections, and the upper end portion of the cam follower slidingly contacts the outer circumference of said second rotor and the approximately lower half portion of the cam follower is received in said at least one axial groove formed in the inner circumference of the first rotor when said at least one first projection is engaged with one of said second projections.

* * * * *